United States Patent [19]

Taghezout et al.

[11] Patent Number: 5,130,594

[45] Date of Patent: Jul. 14, 1992

[54] ELECTROMAGNETIC MOTOR

[75] Inventors: Daho Taghezout, Lausanne; Martin Strahm, Boudry, both of Switzerland

[73] Assignee: ETA SA Fabriques d'Ebauches, Switzerland

[21] Appl. No.: 686,944

[22] Filed: Apr. 18, 1991

[30] Foreign Application Priority Data

Apr. 23, 1990 [FR] France ........................ 90 05240

[51] Int. Cl.$^5$ .............................. H02K 1/12
[52] U.S. Cl. ...................... 310/256; 310/156; 310/179; 310/184; 310/254
[58] Field of Search ............. 310/256, 254, 180, 184, 310/179, 49 R, 162, 156

[56] References Cited

U.S. PATENT DOCUMENTS

| 842,963 | 2/1907 | Latour | 310/184 |
|---|---|---|---|
| 3,427,486 | 2/1969 | Whitney | 310/180 |
| 4,315,363 | 2/1982 | Barone | 310/254 |
| 4,361,790 | 11/1982 | Laesser et al. | 318/698 |
| 4,371,821 | 2/1983 | Laesser et al. | 318/698 |
| 4,788,465 | 11/1988 | Hertrich | 310/269 |
| 5,010,268 | 4/1991 | Dijken | 310/254 |

FOREIGN PATENT DOCUMENTS

| 403516 | 5/1909 | France | 310/256 |
|---|---|---|---|
| 2464516 | 3/1981 | France | . |
| 540597 | 6/1970 | Switzerland | 310/256 |
| 2054978 | 6/1979 | United Kingdom | 310/256 |

OTHER PUBLICATIONS

International Publication No. WO 89/02670.
French Search Report.

Primary Examiner—Steven L. Stephan
Assistant Examiner—Matthew Nguyen
Attorney, Agent, or Firm—Pollock, Vande Sande & Priddy

[57] ABSTRACT

This invention concerns an electromagnetic motor. Such motor includes: a rotor (1) comprises a bipolar permanent magnet, a stator (2) provided with a peripheral stator portion (14) forming a low reluctance magnetic circuit (CM) and an interior or central stator portion (12) on which are arranged n branches including first ends forming polar expansions and second or free ends, and windings (22, 24, 26) adapted to generate a magnetic flux, such motor being characterized in that the windings (22, 24, 26) are mounted on and are respectively anchored at least to the second or free ends of the branches. Such motor is applied for example to operation in a three-phase energization mode.

20 Claims, 5 Drawing Sheets

ELECTROMAGNETIC MOTOR

This invention concerns an electromagnetic motor, particularly adapted to operate in a polyphase energization mode, preferably three phase.

BACKGROUND OF THE INVENTION

Such type of motor, which is in particular described in the patent CH 540 597, generally includes, on the one hand, a rotor provided with a permanent magnet of the bipolar type, and shaped to furnish a motor couple to a mechanism to be driven and, on the other hand, a stator on which are arranged three energization windings respectively driven by an appropriate control circuit.

The stator is provided with a peripheral stator portion having a form essentially circular which forms around the rotor a low reluctance magnetic circuit. Three branches extend from such peripheral stator portion towards the axis of rotation of the rotor so as to form, through their free end, three polar expansions.

Such branches are normally oriented towards the rotational axis of the rotor and they present longitudinal geometric axes intersecting substantially at the rotational axis of the rotor, and displaced from one another by 120°. Each of the driving windings which may be energized by one of the phases of energization via the control circuit, is mounted on one of the branches and generates a magnetic flux. In driving the control circuit, generally one associates several magnetic fluxes with the permanent field of the magnet which, by creation of a mutual couple, cause the rotor to turn.

Such type of motor exhibits numerous advantages.

It offers a good yield, but also it is particularly adapted, as much to function in continuous rotation as in a bidirectional mode.

Nevertheless, with such a motor, because of its particular structure such as has been defined hereinabove, one encounters problems of high manufacturing costs which evidently limit its interest, above all when it must be employed as transducer or again as driver in a relatively high number of copies for each product, as is generally the case in applications such as robotics, automobiles, aeronautics, aerospace or again biomedical engineering. In effect, the motor previously described has essentially as vocation the development of relatively high power, for example for driving vehicles, with the result that it has not been conceived so as to be capable of being made in very large series at low cost, but simply in order to be able to offer adequate output characteristics.

This invention has as purpose to overcome such difficulties by furnishing an electromagnetic motor capable of operating in a polyphase energization mode, preferably three phase, of simple construction, that is to say, capable of being made in very large series at a very low cost price.

SUMMARY OF THE INVENTION

Thus, this invention has as its purpose an electromagnetic motor adapted to operate in an n-phase energization mode, n being $\geq 3$, and of the type comprising a rotor which includes a permanent magnet, preferably bipolar, and which is capable of furnishing a motor couple to a mechanism to be driven, a stator provided, on one hand with a peripheral stator portion forming a low reluctance magnetic circuit, and on the other hand with an interior or central stator portion shaped to receive the rotor, such interior or central stator portion being surrounded by the peripheral stator portion and forming n pole pieces, n windings magnetically coupled to the stator and capable of furnishing a magnetic flux through a core, such windings being adapted to be coupled through a control circuit to an electrical source so as to be respectively energized by n phases from said source, n branches or guide pieces for the magnetic flux arranged on the interior or central stator portion and including first and second ends, said first ends respectively forming n polar expansions, said rotor being pivotally mounted between such polar expansions and at a certain distance therefrom which forms at least a first gap, while said windings are magnetically coupled to said polar expansions through said branches, such motor being characterized in that said windings are mounted on and respectively anchored mechanically at least to the second or free ends of said branches.

According to a preferred embodiment, the windings are anchored onto said branches through their core which is mounted onto at least one of such branches.

There is also specified that the interior and peripheral stator portions are primarily formed by a unique monolithic stator piece in association with the n windings.

Furthermore, the n windings are mounted on the stator piece independently of the assembly of such piece on a support, the n windings being assembled on such piece and being capable of being indiscriminately replaced before or after assembly of the stator piece on said support.

According to another embodiment, the two stator portions respectively peripheral and interior are mechanically distinct and independent, the interior stator portion which is mounted on the peripheral stator portion through the energization windings being capable of occupying multiple angular positions relative to the peripheral stator portion.

It will be understood that thanks to these embodiments a motor and more particularly a transducer or electromagnetic operator has been provided capable of operating in a polyphase energization mode (and preferably three phase), the different constituents of which may be manufactured in a simple manner and at a relatively high cadence, the assembly of such different elements mounted onto one another giving rise to completely standard operations. Furthermore, it will be noted that the arrangement of two stator portions, respectively peripheral and interior, offers numerous possibilities of adaptation of such motor which permit the obtaining of different output characteristics on the basis of a single construction with furthermore the possibility of a total optimization of the volume occupied by such motor.

Such variable character and such optimization of the volume taken up open up the spectrum of use of such motor, as may be well understood, which for an extremely reduced volume offers output power sufficient for the application to which it is intended.

But other characteristics and advantages of the invention will best appear following reading of the detailed description which follows taken in reference to the attached drawings given solely by way of example.

DESCRIPTION OF THE PREFERRED EMBODIMENTS

Figure 1:
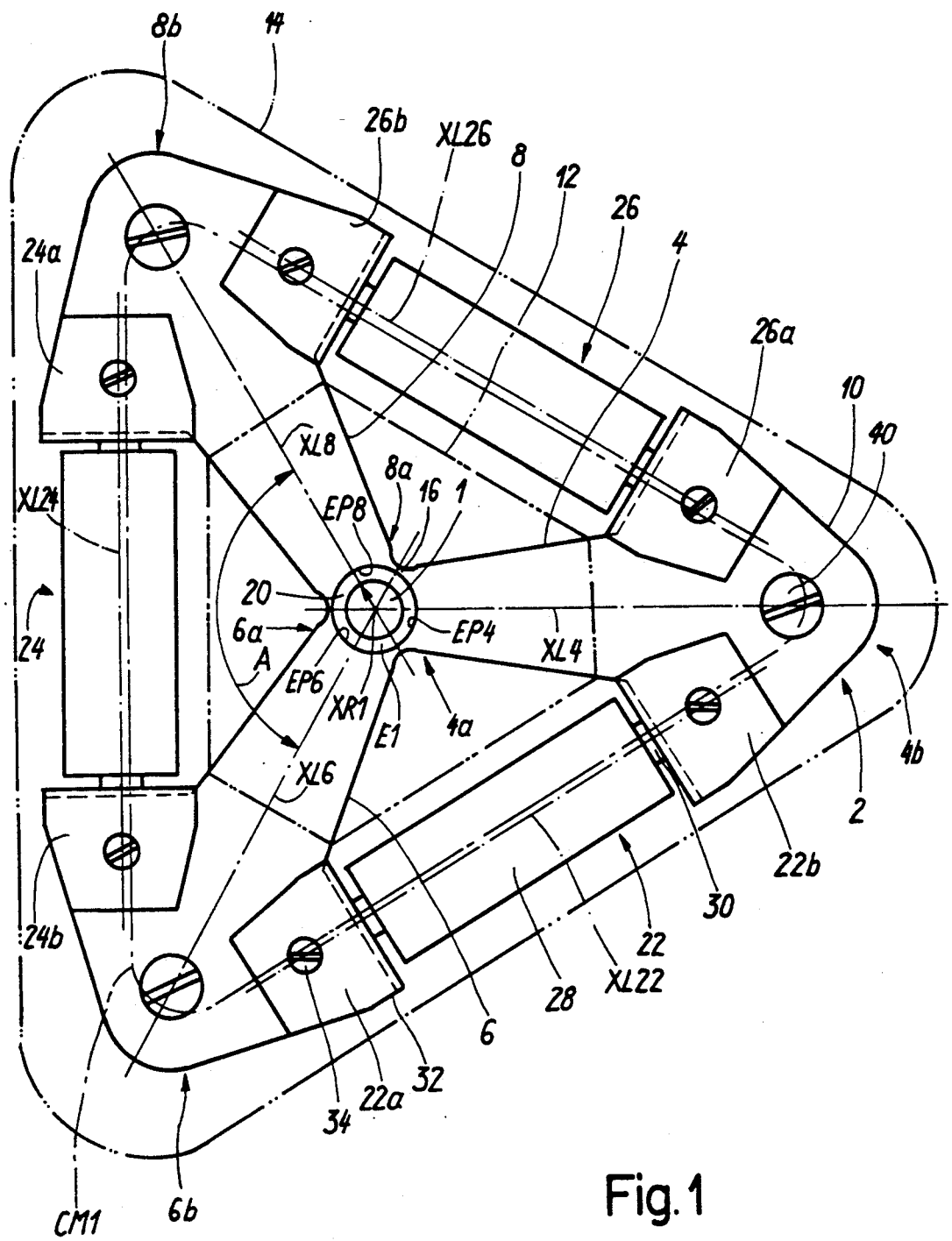
FIGS. 1 to 5 are top views respectively of five embodiments of the motor according to the invention.

The electromagnetic motor according to the invention such as that which is shown according to a first embodiment on FIG. 1 includes in a standard manner a rotor 1 which here is represented in a very schematic fashion and which is intended to furnish a motor couple to a mechanism to be driven (not shown).

Such motor otherwise includes a stator 2 including a stator piece 10 fashioned in the form of a plate stamped out of a material preferably of high magnetic permeability, for instance of an alloy such as that sold under the trademark "Vacoperm". Stator 2 is adapted to interact magnetically with rotor 1, either to cause it to occupy different positions of stable equilibrium, or to drive it in rotation around a rotational axis XR1. Rotor 1 is to this end mounted to be free in rotation by means of pivots housed in bearings which are fixed to a support or by means of an attached cage (not shown).

The stator piece or plaque 10 of stator 2 includes three branches 4, 6 and 8 of identical aspect and displaced from one another by an angle A of about 120°. It is noted that the three branches 4, 6, and 8 are thus arranged on a common and unique stator piece 10, the central region of which, extending substantially from the rotor rotation axis XR1 up to the first contour line represented in broken mixed dashes, forms an interior or central stator portion 12, the free end regions or points of which constitute furthermore portions of a peripheral stator part 14 which extends between the first and a second contour line represented also on FIG. 1 by broken mixed dashes.

The stator piece or plate 10 and, a fortiori, the interior stator part 12 exhibit a star form.

It will be noted that as to the peripheral stator portion 14, it has a general allure of an isosceles triangle and in particular an equilateral triangle, in surrounding on one hand rotor 1 which is substantially arranged at its center, but also on the other hand the interior or central stator portion 12.

This equilateral triangle form is preferred for the peripheral stator part 14, but as is well understood, it could have a different aspect, for instance circular.

The central or interior stator portion 12 is thus essentially formed from the three branches 4, 6 and 8 and more particularly from their portion which extends from the vicinity of rotor 1 towards the exterior of stator 2, namely towards the peripheral stator portion 14. Such three branches 4, 6 and 8 respectively show a longitudinal geometric axis XL4, XL6 and XL8, such three longitudinal axes XL4, XL6 and XL8, which are normal to the rotational axis XR1, being separated from one another by angle A. Such longitudinal axes XL4, XL6 and XL8, and more particularly the branches 4, 6, and 8 which materialize them, are preferably arranged in a common plane which constitutes a plane of the electromagnetic field. To this end, it will be noted that this electromagnetic motor is of the radial field type, since the magnetic field or fields which are created in stator 2 exhibit an orientation normal to the axis of rotation of rotor XR1.

Branches 4, 6 and 8 can at least partially extend in different planes and be oriented parallel to one another and to the rotational axis XR1 of the rotor.

The three branches 4, 6 and 8 respectively exhibit first and second ends 4a, 6a, 8a and 4b, 6b, 8b; the first ends 4a, 6a and 8a of the three branches 4, 6 and 8 form polar expansions EP4, EP6 and EP8 facing which rotor 1 is capable of being brought to rotate. To this end it will be specified that rotor 1 preferably includes a permanent magnet preferably of the bipolar type having standard North-South diametral magnetization, such magnetization axis having been shown on the figures by an arrow pointed in the direction of the North pole formed by such magnet. The motor according to the invention is not limited to the employment of a bipolar rotor, but could also as is well understood be equipped with a rotor of the multipolar type.

It will be furthermore noted that the three branches 4, 6 and 8 are magnetically and mechanically coupled among themselves at the central or interior stator portion 12 through their first ends 4a, 6a and 8a.

Such first ends 4a, 6a and 8a are accordingly coupled together by isthmuses 16 which have as function to form saturation means for the magnetic flux which is generated in stator 2, such means being defined as first flux saturation means.

Thus, the most central region of the interior stator part 12 which, as will be noted, thanks to the arrangement of its branches 4, 6 and 8 shows a general Y aspect, is pierced at its center by an orifice 20 of which the lateral wall, which is continuous and circular, materializes said polar expansions EP4, EP6 and EP8. Branches 4, 6 and 8 constitute the pole pieces of the stator part or plate 10 and more particularly, of the interior or central stator portion 12.

Rotor 1 is mounted in orifice 20 at a certain distance from the lateral face thereof and in particular at a certain distance from the polar expansions EP4, EP6 and EP8, such play constituting a gap E1 which will be defined hereinafter as first gap.

As to the peripheral stator portion 14, this is constituted partially by second or free ends 4b, 6b and 8b of said branches 4, 6 and 8 of the interior stator portion 12 and, more particularly, by the peak of such branches but also by the windings 22, 24 and 26. Such windings 22, 24 and 26 which assume a form preferably essentially cylindrical, are constituted in a standard manner by a coil 28 of conducting wire in numerous turns, over several coaxial ranks around a core 30. Such windings 22, 24 and 26 are all capable of generating a magnetic flux by having an electric current pass through them preferably coming from a three phase energization source driven by a control circuit, generally of the electronic type (not shown). Each of such windings may be fed by one of the three phases of the three phase energization source.

It will be here noted that one has available as many windings as phases, but also as many phases as one has branches and expansions and pole pieces on the stator.

Windings 22, 24 and 26, which in the most simple operational mode all form energization windings, include respectively first ends 22a, 24a and 26a and second ends 22b, 24b and 26b. Such energization windings 22, 24 and 26 and more particularly their respective longitudinal geometrical axes XL22, XL24 and XL26 extend preferably in a single and common plane which is substantially parallel to that formed by the axes XL4, XL6 and XL8 of the respective branches 4, 6 and 8.

At the two ends of the three windings 22, 24 and 26 are provided lugs 32 fixed to corresponding cores 30, such lugs 32 being advantageously integrally formed from the same material.

Lugs 32 form assembly means for the windings 22, 24 and 26 onto the stator piece or plate 10 and more particularly onto the branches of the interior or central stator portion 12 by including respectively an orifice (not referenced) in which may be engaged for instance a screw 34 which is engaged in the free ends of the respective branches 4, 6 and 8.

It is thus to be understood that the three windings 22, 24 and 26 are all mechanically independent from one another in being each mounted and anchored on the two respective free ends of two distinct neighbouring branches.

The six lugs 32 which are by one of their sides of greater surface which is preferably planar, in intimate contact with one of the lateral faces of branches 4, 6 and 8, but also the cores 30 and the free ends 4b, 6b and 8b of branches 4, 6 and 8, together materialize the peripheral stator portion 14 and form a magnetic circuit CM1 of low magnetic reluctance around rotor 1 and the interior or central stator portion 12.

It will also be specified that each of branches 4, 6 and 8 shows the form of an arrow the base of which constitutes on one hand the first ends 4a, 6a and 8a and on the other hand, the corresponding polar expansions EP4, EP6 and EP8. The bodies of these branches or arrows open out in width from such base towards a head or peak which extends in the direction of each of the corresponding windings.

Thus, each of branches 4, 6 and 8 exhibits in the vicinity of its first end 4a, 6a and 8a, a width which increases progressively from such first end towards the second end 4b, 6b, 8b; as to the thickness of the branches 4, 6 and 8 which is relatively small, that is to say on the order of 0.5 mm ($0.5 \cdot 10^{-3}$ m) this is substantially constant.

The second end, or free end 4b, 6b and 8b of such branches 4, 6 and 8 forms a mechanical fastening means for the motor onto a support (not shown). Thus, such free ends 4b, 6b and 8b are preferably transversally pierced by an orifice opening out (not referenced) and intended to receive an assembly means of the bolt-nut type, such as a bolt 40 engaged on the previously cited support. It is also to be noted that the second end 4b, 6b and 8b of each of the respective branches 4, 6 and 8 bears a lug 32 from two of the three windings 22, 24 and 26.

Such second or free ends 4b, 6b and 8b furthermore constitute a mechanical and magnetic coupling between the cores 30, and the three windings 22, 24 and 26, but also between each polar expansion EP4, EP6 and EP8 and two of the three windings 22, 24 and 26. It is already understood that the motor according to the invention is of extremely simple conception since it puts into operation three windings which may be practically identical and made in large series without the need for complex machines. Effectively, in being all individualized and mechanically independent, such windings offer extremely easy access to the coil 28 on core 30. Furthermore, the stator piece 10 which includes the three branches 4, 6 and 8 coupled by the isthmuses 16 may be made at very high speed by production techniques such as die forming or blanking (each piece being, as may be repeated, formed by a plate exhibiting a relatively small thickness) and it may be supplied from material in the form of sheets or rolls.

It will be further noted that the interior stator portions 12 and peripheral portions 14 are essentially formed by the stator piece 10 in association with the n windings 22, 24 and 26. Thus, apart from windings 22, 24 and 26, the motor according to the invention is composed only of a single monolithic stator piece 10. One has thus considerably limited the number of pieces which make up this motor. Furthermore, the n windings 22, 24 and 26 are assembled on the stator piece 10 independently of the assembly of such piece on its support (not shown). Windings 22, 24 and 26 are mounted on such piece and may be indiscriminately replaced before or after mounting of the stator piece 10 on said support.

Furthermore, the assembly of the mounted windings 22, 24 and 26 on the unique piece 10 may be easily brought about since it does not necessitate any particularly precise positioning, but solely a bolting or perhaps riveting action of the lugs 32 onto the free ends 4b, 6b and 8b of the corresponding branches 4, 6 and 8.

It will be specified that windings 22, 24 and 26 may present aspects other than straight. Effectively, they may be slightly curved (not shown) which would improve the yield and power of the motor without prejudicing its space requirements.

Figure 2:
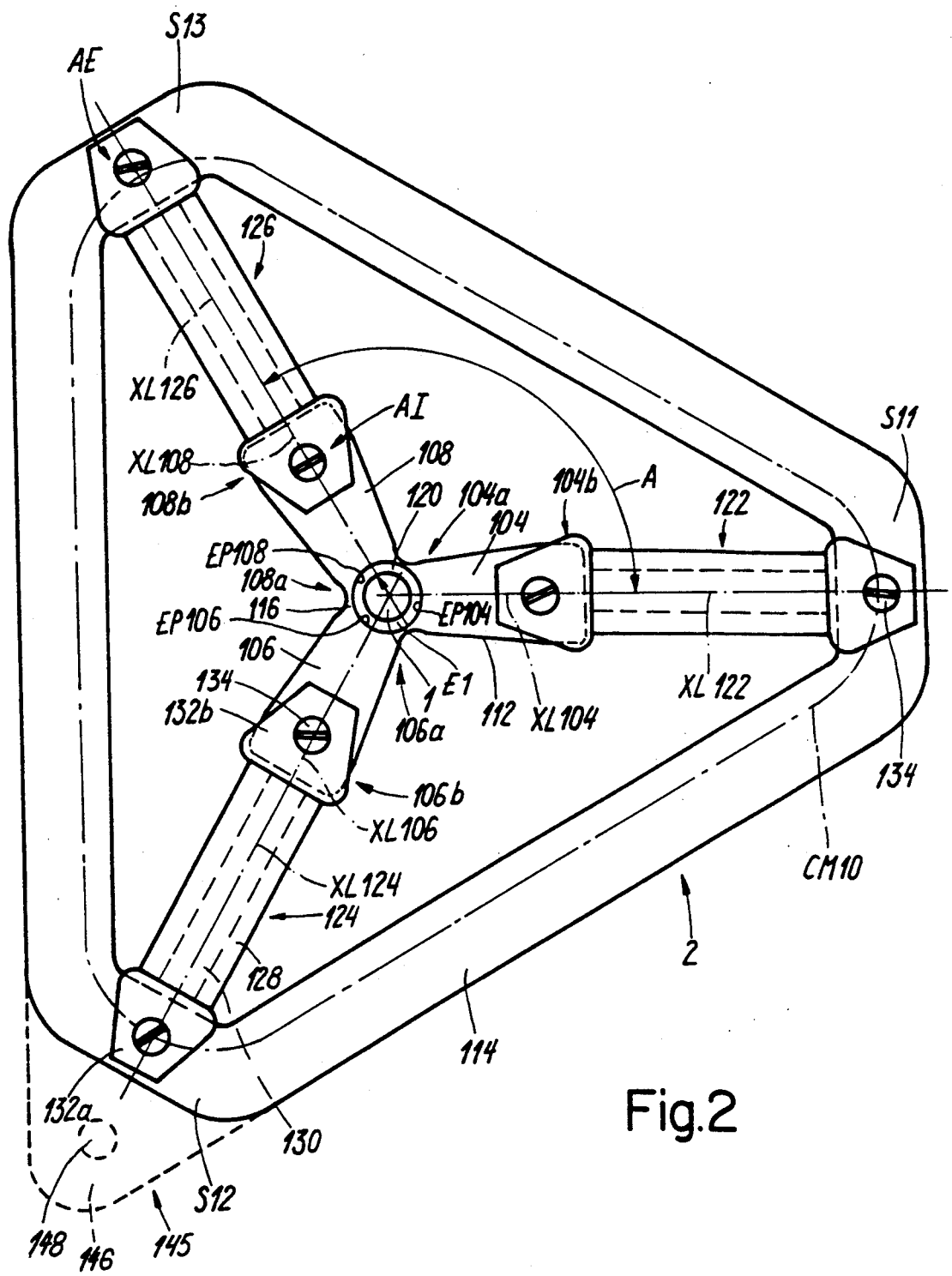

Henceforth, reference will be had to FIG. 2 which represents the second embodiment of the electromagnetic motor according to the invention.

This motor includes, as that which has just been described, a rotor 1 which is pivotally mounted relative to and at the interior of a stator 2.

However, in this embodiment, stator 2 differs substantially from that of the embodiment which has just been described, in particular, in that the peripheral stator portion 114 is formed from a single and common piece.

This single piece forming the peripheral stator portion 114 assumes a general form of isosceles triangle and more particularly an equilateral triangle the vertices S11, S12 and S13 of which have been truncated. The electromagnetic motor according to this second embodiment also includes a central or interior stator portion 112 which is provided with n branches (n=3 in this example), respectively 104, 106 and 108 and which are coupled among themselves in an identical manner to that of the preceding embodiment, that is to say, through isthmuses or necks 116.

Such branches 104, 106 and 108 also form at their first ends 104a, 106a and 108a by which they are united, polar expansions EP104, EP106 and EP108 shaped by the lateral flank of a circular orifice 120 provided in the region of intersection of the three branches 104, 106 and 108. As in the previous embodiment, rotor 1 is movably mounted within such orifice 120 facing the three polar expansions EP104, EP106 and EP108. The n branches 104, 106 and 108 form n pole pieces.

Preferably, the three branches 104, 106 and 108 especially their respective longitudinal geometric axes XL104, XL106 and XL108 are also separated by an angle A preferably equal to 120°. It will be noted that in this embodiment the second or free ends 104b, 106b and 108b of the branches 104, 106 and 108 are respectively coupled to three energization windings 122, 124 and 126 and more particularly, each of them is coupled to one of the lugs 132b of such energization windings.

Thus and in view of the preceding embodiment, it is understood that the motor windings in accordance with the invention are mounted on and respectively mechanically anchored at least to the second or free ends of the branches. Furthermore, such windings are anchored onto said branches through their core 130 which is mechanically attached onto at least one of such branches.

Lugs 132b are secured onto the corresponding second or free ends 104b, 106b and 108b of branches 104, 106 and 108 through fastening screws 134.

The other lug 132a of such windings 122, 124 and 126 is coupled to the peripheral stator portion 114 which alone forms a low reluctance magnetic circuit CM10. Such lugs 132a are also coupled to the peripheral stator portion 114 through fastening screws 134.

Windings 122, 124 and 126 have a configuration identical to those of the first embodiment, that is to say, they include a core 130 around which is wound a winding 128 of an electrically conductive wire forming a plurality of turns.

Such windings 122, 124 and 126 are also coupled to an energization source, preferably three phase, via an electronic control circuit (not shown). Preferably, such electronic control circuit is conceived in a manner such that the energization windings 122, 124 and 126 may be independently energized.

It is thus noted that in this embodiment the energization windings 122, 124 and 126 which are mounted onto the respective central 112 and peripheral 114 stator portions are anchored solely by one of their lugs and in particular lug 132a referred to as exterior in the vicinity of one of the vertices S11, S12, S13 of the peripheral stator portion 114.

The anchor points of the exterior lugs 132a onto the stator portion 114 and more particularly onto the vertices S11, S12 and S13 constitute for windings 122, 124 and 126 the anchor points furthest towards the exterior, while the connection between the opposite lugs 132b and the central stator portion constitute for these same windings the anchor points furthest towards the interior.

Such respective exterior and interior anchor points are referenced AE and AI.

It will be noted that in this embodiment as well as in the other three which will be described hereinafter, the central or interior stator portion 112 is coupled to the peripheral stator portion 114 through the three mounted windings 122, 124 and 126.

In this special embodiment, the energization windings 122, 124 and 126 are arranged relative to branches 104, 106 and 108 in a manner such that their respective longitudinal geometric axes XL122, XL124 and XL126 coincide substantially with the longitudinal geometric axes XL104, XL106 and XL108 of the respective branches 104, 106 and 108.

It is understood that the electromagnetic motor according to this embodiment is also of an extremely simple conception which permits it to be manufactured by cold forming or low temperature methods.

Effectively, the respective central 112 and peripheral 114 stator portions are constituted by a thin sheet of material, preferably of high magnetic permeability which may be obtained from sheets or laminated rolls.

Furthermore, it will be noted that with a common single punch one may simultaneously manufacture the central 112 and peripheral 114 stator portions.

Furthermore, the assembly of the different pieces among themselves, namely the two stator portions and the three energization windings may be brought about in an automated fashion at high speed since the relative positioning of all these pieces relative to one another has no particular incidence on the magnetic behaviour of the motor with the evident exception of the position of rotor 1 relative to the central stator portion 112 and in particular relative to the three polar expansions EP104, EP106 and EP108.

The mounting of such electromagnetic motor on a support intended to accommodate it may be brought about by fastening means 145 arranged on the peripheral stator portion 114 and more particularly by extensions 146 (a single one of which is shown) provided on such peripheral stator portion 114 proximate the respective vertices S11, S12 and S13. Such fastening means, represented by broken dashes, include an orifice 148 shaped to receive a fastening screw (not shown).

It will also be noted that in this embodiment the free ends 104b, 106b and 108b of branches 104, 106 and 108 are all respectively oriented in the direction of one of the vertices S11, S12 and S13 of the peripheral stator portion 114.

In particular, the free end 104b, 106b and 108b of each branch 104, 106 and 108 is oriented in the direction of the exterior anchor point AE of the winding which it supports.

Figure 3:
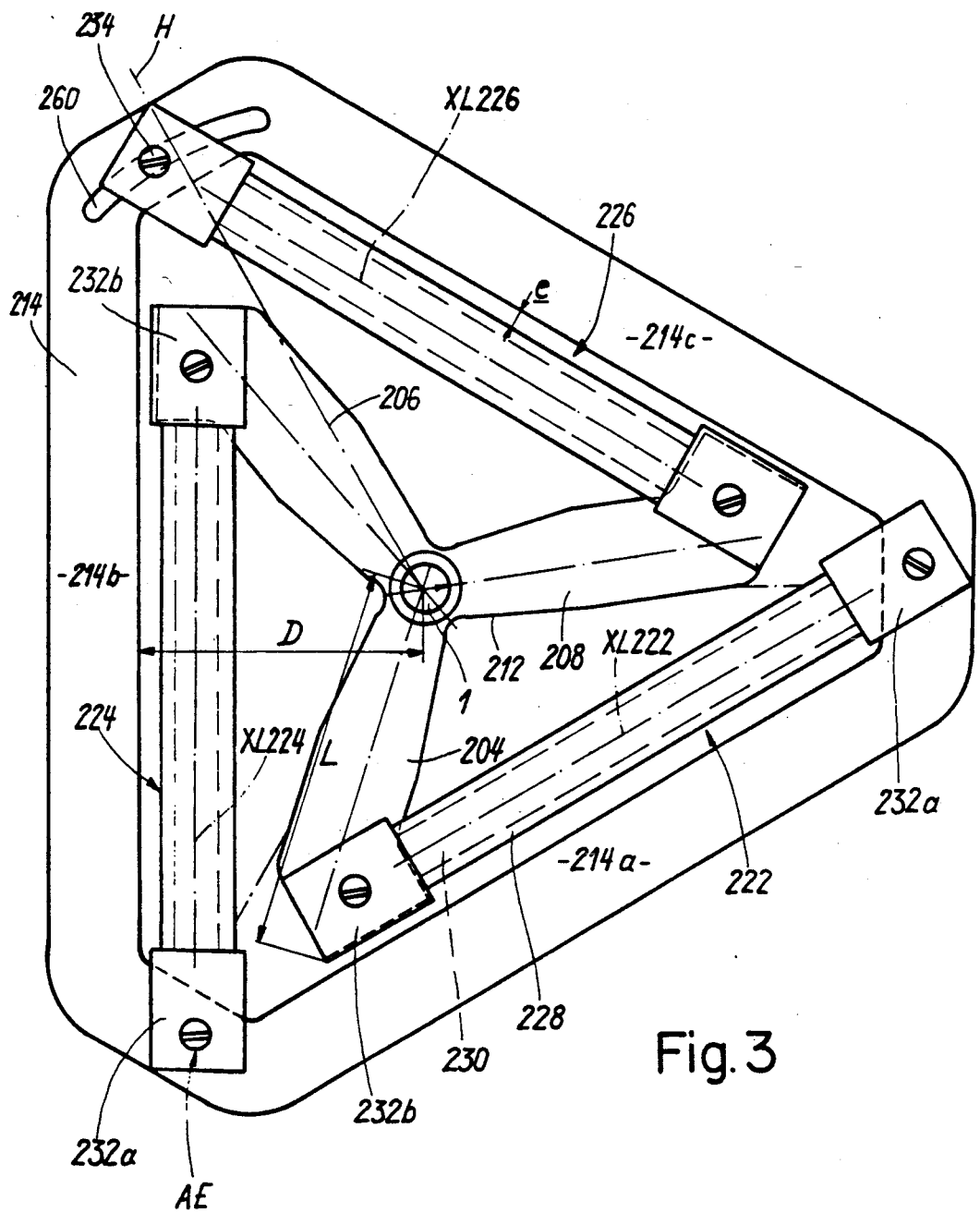

FIG. 3 shows a third embodiment of the electromagnetic motor according to the invention, which includes a peripheral stator portion 214 identical to the stator portion 114 previously described.

The interior stator portion 212 shows a central region substantially identical to that of the stator portion 112. It is also pierced by an orifice 220 intended to accommodate rotor 1.

However, in this embodiment, the configuration of the interior stator portion 212 is such that it enables equipping such motor with windings 222, 224 and 226 longer than those of the preceding embodiment and thus which present superior output characteristics.

Such windings 222, 224 and 226 are however formed exactly on the same principle, namely they include a core 230 around which is wound a coil 228 of an electrically conductive wire arranged in adjacent and coaxial turns. Each core 230 is terminated at its two ends by two lugs respectively indicated 232a and 232b.

Windings of great length such as windings 222, 224 and 226 enable the providing of a coil 228 having either a relatively high number of turns, or an electrically conductive wire of a diameter greater than that which has been provided for the windings of short dimension.

It is thus understood that such an arrangement enables increasing substantially the output power of the motor.

The three branches 204, 206 and 208 of the interior or central stator portion 212 are of a length which is greater than those of the stator portion 112 previously described, their respective length L being such that it is greater that the distance D between the rotation axis of rotor XR1 which, inter alia, is merged with the center of gravity of the peripheral stator portion 214 and the interior edge of such peripheral stator portion 214.

Furthermore, the exterior anchor points AE of the lugs 232a no longer coincide with the altitudes H.

Such exterior anchor points AE of windings 222, 224 and 226 are thus laterally separated relative to altitudes H of the peripheral stator portion 214 in a manner such that such energization windings 222, 224 and 226 are arranged in a manner substantially parallel to arms 214a, 214b and 214c of the peripheral stator portion 214. As is well understood, a space e is left between the exterior periphery of the energization windings and the interior edge of the peripheral stator portion 214.

It is determined thus that the longitudinal geometric axes XL222, XL224 and XL226 of the windings no longer meet at the rotation axis of rotor XR1. On the contrary, they interesect substantially proximate their exterior anchor points AE. Thus, when the central or interior stator portion 212 has a geometrical configuration of the "star" type, windings 222, 224 and 226 show a configuration of the "triangle" type.

Considering for example winding 224, it will be noted that its interior lug 232b which, as will be remembered, is by definition anchored to the central stator portion 212, is coupled to branch 206 which in this embodiment is oriented in another direction than that of the exterior anchor point AE of such winding 224.

Thus, for the three windings 222, 224 and 226 their interior lug 232b is coupled to one of the branches of the central stator portion 212 which is oriented in a direction shifted relative to the anchor point of the exterior lug 232a corresponding to such interior lug.

One even observes that in this special example the interior lug 232b of each winding is coupled to one of the branches of the interior or central stator portion 212 which is oriented towards the exterior anchor point AE of one of the neighboring windings. It will be understood that thanks to this arrangement the interior space arranged within the peripheral stator portion is optimized in improving the output characteristics of the motor. It is understood also that on the basis of a common peripheral stator portion 114 (FIG. 2) and 214 (FIG. 3), that is to say of the same form and same dimensions, one may obtain motors having different output characteristics. This evidently enables providing a standard form for all the peripheral stator portions the contour of which determines the exterior space requirements of the motor. Once such peripheral stator portion has been mounted on its support, one may associate therewith different "pairs" of windings-central stator portion, such as, for example, the interior or central stator portion 112 equipped with windings 122, 124 and 126 or the interior or central stator portion 212 equipped with windings 222, 224 and 226.

To this end, the exterior anchor points AE of the energization windings on the peripheral stator portion 214 are preferably formed by oblong slots 260 which are rectilinear or curved (a single one of which has been shown) in which are engaged bolt-nut systems such as bolts 234 retaining the exterior lugs 232a.

It will also be noted that such an arrangement, in which the two stator portions, respectively peripheral 214 and central 212, as in the preceding embodiment are mechanically distinct and independent and on which the energization windings are mounted enables arranging the central stator portion in multiple angular positions (evidently by using energization windings of different lengths). Consequently, one may easily define the stable equilibrium positions of the rotor 1 which, as will be recalled, are defined by the orientation of the polar expansions independently of the positioning of the peripheral stator portion 214. It will be specified that these stable equilibrium positions may be defined by other means such as, for instance, by the form of orifice 220 which may include positioning cells (not shown). Thus, in providing adjustment means such as oblong slots in the securing lugs 232a and/or 232b and/or in the stator branches 212 one may easily adjust the stable equilibrium positions of rotor 1 relative to a mechanism to be driven (not shown) when the electromagnetic motor is permanently installed on its support, this permitting the ready adjustment for instance of an indicating element of the mechanism to be driven and eventually, its starting point about special positions.

Figure 4:
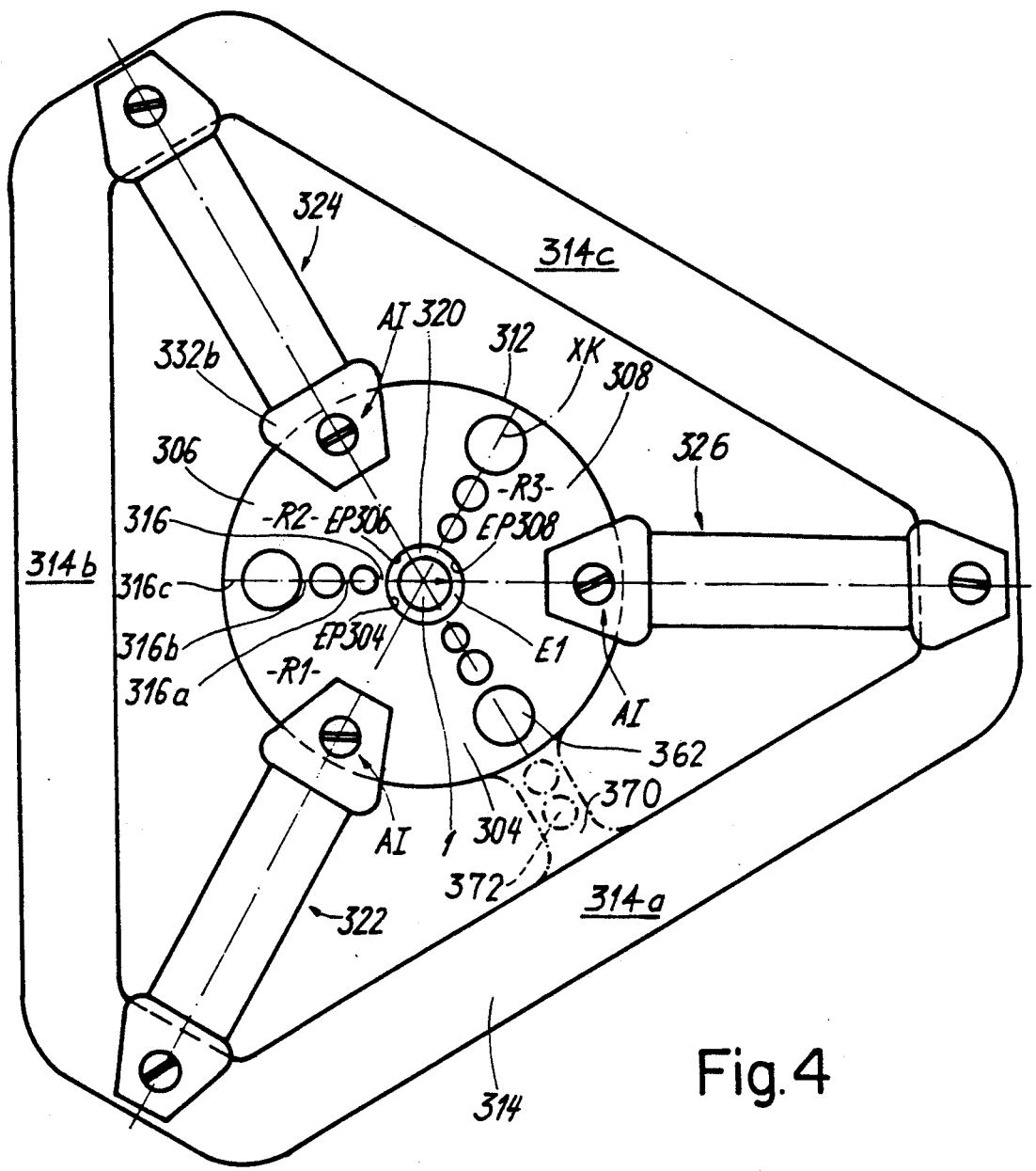

FIG. 4 shows a fourth embodiment in which the peripheral stator portion 314 and the respective three energization windings 322, 324 and 326 are identical to those of the second embodiment described hereinbefore and shown on FIG. 2.

In this fourth embodiment, the interior or central stator portion 312 is constituted by an annular disc, the central orifice 320 of which is shaped to accommodate rotor 1. Such annular disc which forms the central stator portion 312 includes a certain number of recesses 362 which extend in alignment and at a small distance from one another and the central orifice 320 up to the exterior peripheral edge of such disc.

Such recesses 362 which here have a circular form are arranged beside one another on the geometric axes XK extending radially from the center of orifice 320 in a manner to intersect at this point, namely in coincidence with the rotation axis XR1 of rotor 1.

Such axes XK on which the recesses 362 are provided, are arranged on either side of the anchor points AI of the interior lugs 332b. Such recesses 362 and more especially such groups of recesses, constitute saturation means for the magnetic flux, the function of which is identical to that of the isthmuses 16, 116 and 216 of the preceding embodiments. More especially, one again finds isthmuses 316 which are equivalent to the isthmuses 16, 116, 216 but which are associated with isthmuses 316a, b, c arranged one following the others in rows and in parallel orientations orthogonally to the axes XK. Regions R1, R2 and R3 of the annular disc 312, which are left between the three groups of recesses and isthmuses 362 in the central stator portion as the branches of the central stator portions previously described, constitute magnetic flux guidance elements 304, 306 and 308 at one end of which are formed polar expansions EP304, EP306 and EP308. One sees here as well that such interior or central stator portion 312 is of an extremely simple conception and may be easily obtained by stamping or drawing. Furthermore its cellular structure confers thereto a certain rigidity assuring good strength to stator 2.

Furthermore, one shows in dots and dashes on FIG. 4 a connecting foot 370 enabling mechanically connecting the interior stator portion 312 to the peripheral stator portion 314. In this foot are arranged further recesses 372 intended to form additional saturation means for the magnetic flux and to prevent passage of such flux proximate such foot 370. The two stator portions 312 and 314 form then a single piece. There has been shown a single foot 370, but others may be provided between the stator portion 312 and the arms 314a, 314b and 314c of the peripheral stator portion 314, extending in a manner diametrally opposite to windings 322 to 326 facing recesses 362 and being integrally formed from the same material as the two stator portions 312 and 314.

Figure 5:
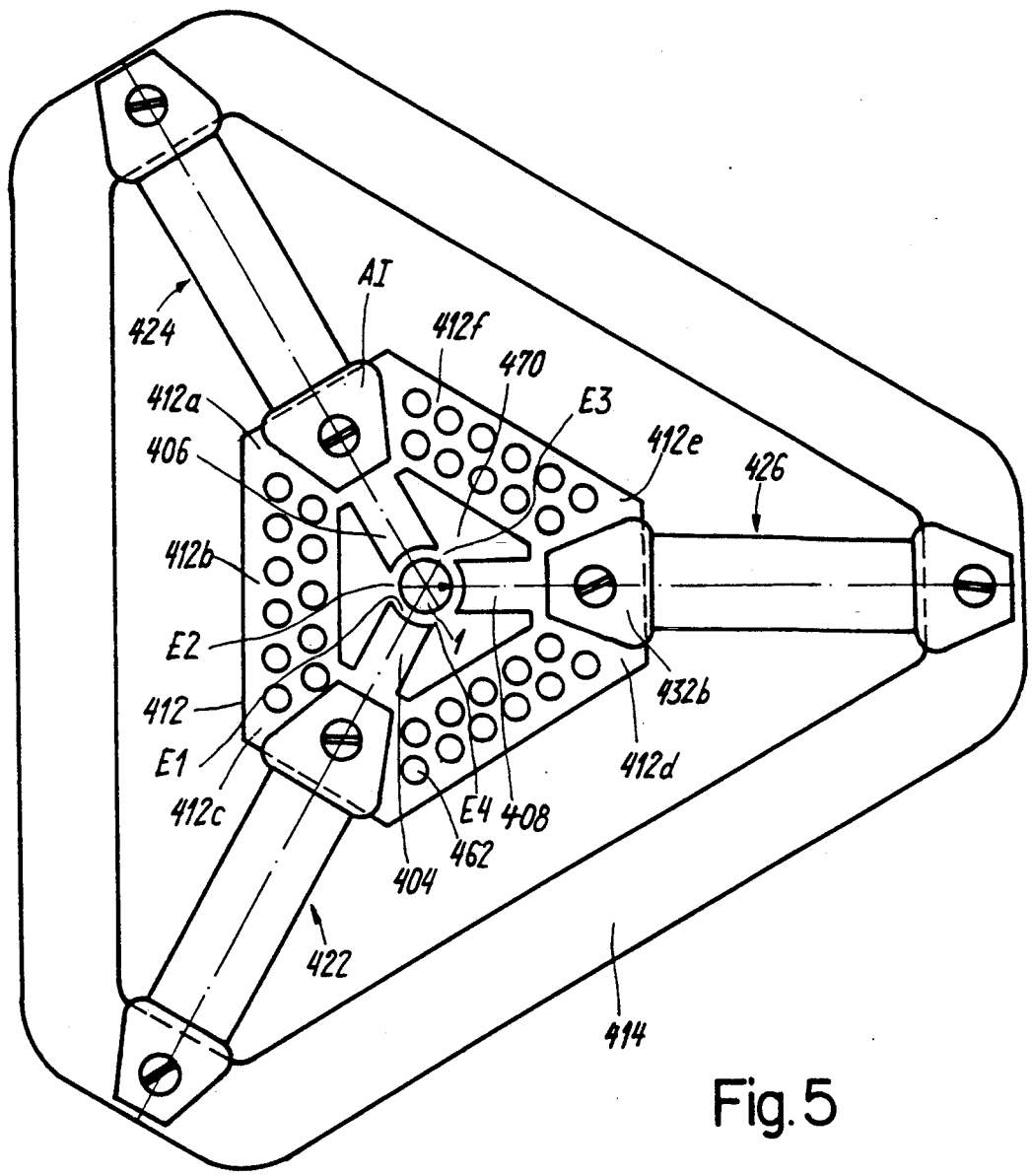

FIG. 5 represents an embodiment in which the peripheral stator portion 414, and as well the energization windings 422, 424 and 426 are of a construction completely identical to the embodiment which has just been described. In this embodiment, the central or interior stator portion 412 is made up, as is the peripheral stator portion 414, in the form of a single annular piece closed in on itself. Such piece, which is constituted by a thin sheet obtained preferably from a material with high magnetic permeability, has the general aspect of a hexagonal polygon, or more specifically, an isosceles triangle and in particular an equilateral triangle from which the vertices have been cut off. Such central stator portion 412 thus includes six arms, respectively 412a to 412f, arms 412a, 412c and 412e forming the interior anchor points AI for the interior lugs 432b of energization windings, respectively 422, 424 and 426. The second arms, respectively 412b, 412d and 412f, which form the connection between the first arms 412a, 412c and 412e, are axially pierced with a certain number of openings 462 constituting as in the preceding embodiment, magnetic flux saturation means referred to as second saturation means.

Furthermore, such stator portion 412 comprises gaps E2 to E4 left between the respective branches 404, 406 and 408 and in particular between their respective polar expansions and these in addition to the first gap E1 provided between rotor 1 and the polar expansions as in the previous embodiments. Here one notes that the branches of the central stator portion 412 extend in a direction normal to arms 412a, 412c and 412e which support the energization windings 422, 424 and 426. The central region of the stator portion 412 which is provided between the polar expansions formed by the free ends of branches 404, 406 and 408, is shaped to accommodate rotor 1.

One thus notes that in this embodiment the free or first ends of branches 404, 406 and 408 constitute the polar expansions of stator 2, while the other, or second ends of such branches, are connected together through arms 412b, 412d and 412f forming by their cellular structure the second magnetic flux saturation means. The second ends of these branches receive furthermore the energization windings. It is also understood that the central stator portion 412 may be easily formed by a deformation operation on a thin sheet of an appropriate material.

It will be specified that in the embodiments of FIGS. 2 to 5, the arms of the peripheral stator portion may be provided with windings, active or sensing, which have not been shown.

What we claim is:

1. An electromagnetic motor adapted to operate in a n-phase energization mode, n being greater than or equal to 3, said motor comprising:
   a rotor which includes a permanent magnet, and which is capable of furnishing a motor couple to a mechanism to be driven,
   a stator provided on one hand with a peripheral stator portion forming a low reluctance magnetic circuit, and on the other hand with an interior stator portion shaped to receive the rotor, said interior stator portion being surrounded by the peripheral stator portion,
   n windings magnetically coupled to the stator and capable of furnishing a magnetic flux through a core when they are respectively energized by the n phases,
   n branches arranged on the interior stator portion, said interior stator portion comprising a plate like member having a small thickness and exhibiting a star shape, each of said branches extending towards the peripheral stator portion and including first and second ends, said first ends respectively forming n polar expansions and n pole pieces, said rotor being mounted to pivot between said polar expansion and at a radial distance therefrom which forms at least a first gap, and said windings being magnetically coupled to said polar expansions through said branches and mounted on and respectively anchored mechanically at least to the second ends of said branches.

2. A motor as set forth in claim 1 wherein the windings are anchored on said branches through their core which is mechanically mounted on at least one of said branches.

3. A motor as set forth in claim 2 wherein the peripheral interior stator portions are primarily formed by a monolithic stator piece in association with the n windings.

4. A motor as set forth in claim 3 wherein said first gap extends entirely through said interior stator portion in parallel with the pivotal axis of said rotor.

5. A motor as set forth in claim 3 wherein the n windings are mounted on the stator piece independently of the assembly of said piece on a support, the n windings being mounted on said piece and being capable of being indiscriminately replaced before or after the assembly of the stator piece on said support.

6. A motor as set forth in claim 1 wherein the peripheral and interior stator portions are primarily formed by a monolithic stator piece in association with the n windings.

7. A motor as set forth in claim 6 wherein said first gap extends entirely through said interior stator portion in parallel with the pivotal axis of said rotor.

8. A motor as set forth in claim 6 wherein the n windings are mounted on the stator piece independently of the assembly of said piece on a support, the n windings being mounted on said piece and being capable of being indiscriminately replaced before or after the assembly of the stator piece on said support.

9. A motor as set forth in claim 8 wherein said second end of each of said branches bears a lug from each of two of the n windings as well as a mechanical securing means for the motor onto a support.

10. A motor as set forth in claim 9 wherein the peripheral stator portion is formed by the cores of the windings, extended by their respective lugs and by the second end of said branches, said second end forming at least a mechanical and magnetic connection between said cores.

11. A motor as set forth in claim 1 wherein the two respective stator portions, peripheral and interior, are mechanically distinct and independent, the interior stator portion which is mounted on the peripheral stator portion through the windings being capable of occupying multiple angular positions relative to said peripheral stator portion.

12. A motor as set forth in claim 11 wherein said first gap extends entirely through said interior stator portion in parallel with the pivotal axis of said rotor.

13. A motor as set forth in claim 11 wherein the peripheral stator portion comprises a triangular form which is isoceles, such as equilateral.

14. A motor as set forth in claim 13 wherein each winding which is mounted on the stator is anchored by an exterior lug at an exterior anchor point in the vicinity of one of the vertices of the peripheral stator portion.

15. A motor as set forth in claim 13 wherein each winding which is coupled to the interior stator portion is coupled by an interior lug to a corresponding branch of the interior stator portion which is oriented in a direction substantially shifted relative to the exterior anchor point of said same winding onto the peripheral stator portion.

16. A motor as set forth in claim 15 wherein the corresponding branch to which each winding is coupled by an interior lug is oriented towards the exterior anchor point of one of the neighboring windings.

17. A motor as set forth in claim 16 wherein the windings are arranged in a manner substantially parallel to the arms of the peripheral stator portion.

18. A motor as set forth in claim 1 wherein the permanent magnet is bipolar.

19. A motor as set forth in claim 18 wherein said first gap extends entirely through said interior stator portion in parallel with the pivotal axis of said rotor.

20. A motor as set forth in claim 1 wherein said first gap extends entirely through said interior stator portion in parallel with the pivotal axis of said rotor.

* * * * *

UNITED STATES PATENT AND TRADEMARK OFFICE
CERTIFICATE OF CORRECTION

PATENT NO. : 5,130,594

DATED : July 14, 1992

INVENTOR(S) : Daho Taghezout, et al.

It is certified that error appears in the above-identified patent and that said Letters Patent is hereby corrected as shown below:

Column 11, line 66, change "expansion" to --expansions--.

Column 12, line 10, before "interior" insert --and--.

Signed and Sealed this

Seventeenth Day of August, 1993

Attest:

BRUCE LEHMAN

Attesting Officer

Commissioner of Patents and Trademarks